Jan. 14, 1936.   S. SHAFER, JR   2,028,094
SLUDGE REMOVING APPARATUS
Filed April 17, 1935   2 Sheets-Sheet 1
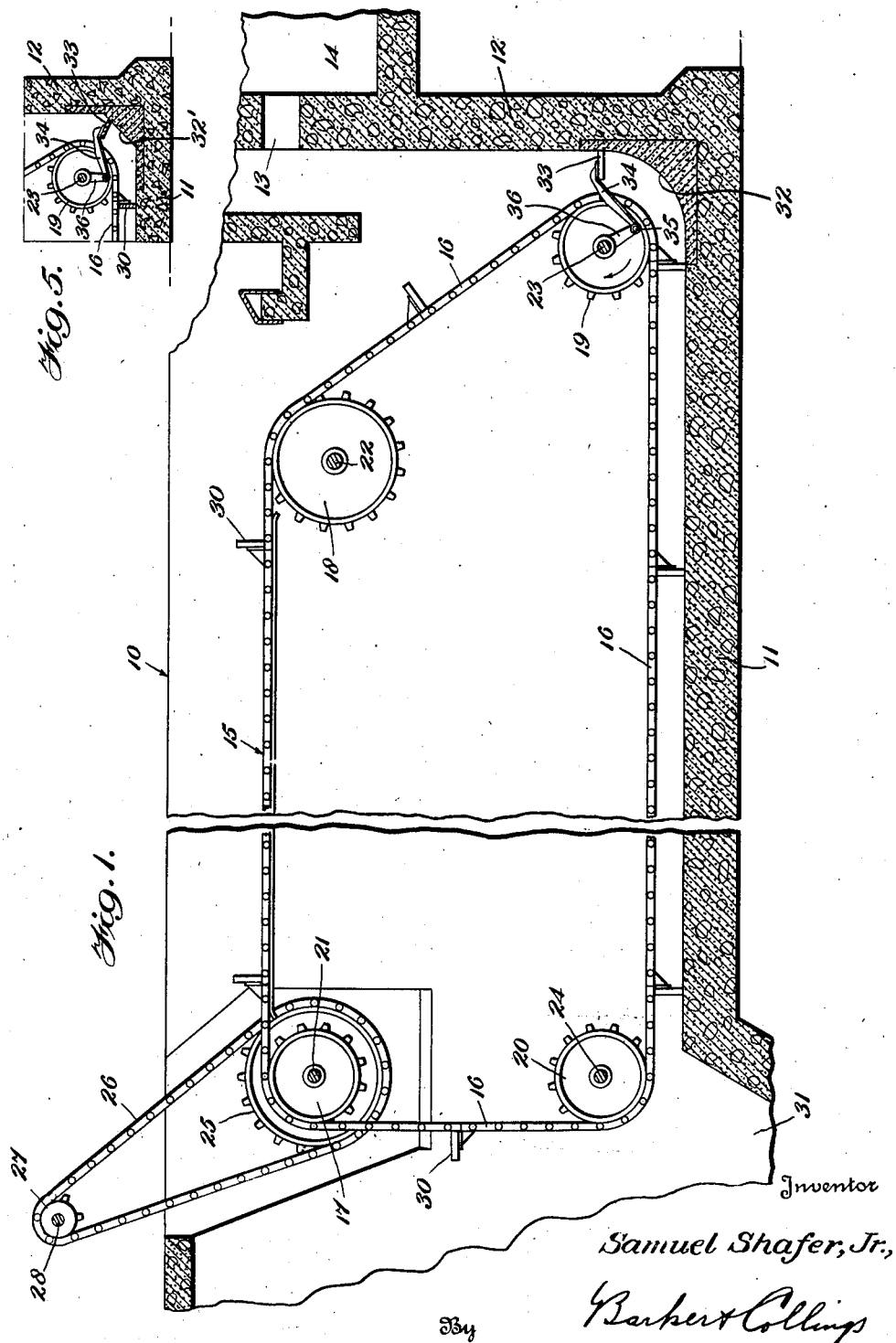
Inventor
Samuel Shafer, Jr.,
By Barker & Collings
Attorneys Jan. 14, 1936.  S. SHAFER, JR  2,028,094
SLUDGE REMOVING APPARATUS
Filed April 17, 1935  2 Sheets-Sheet 2
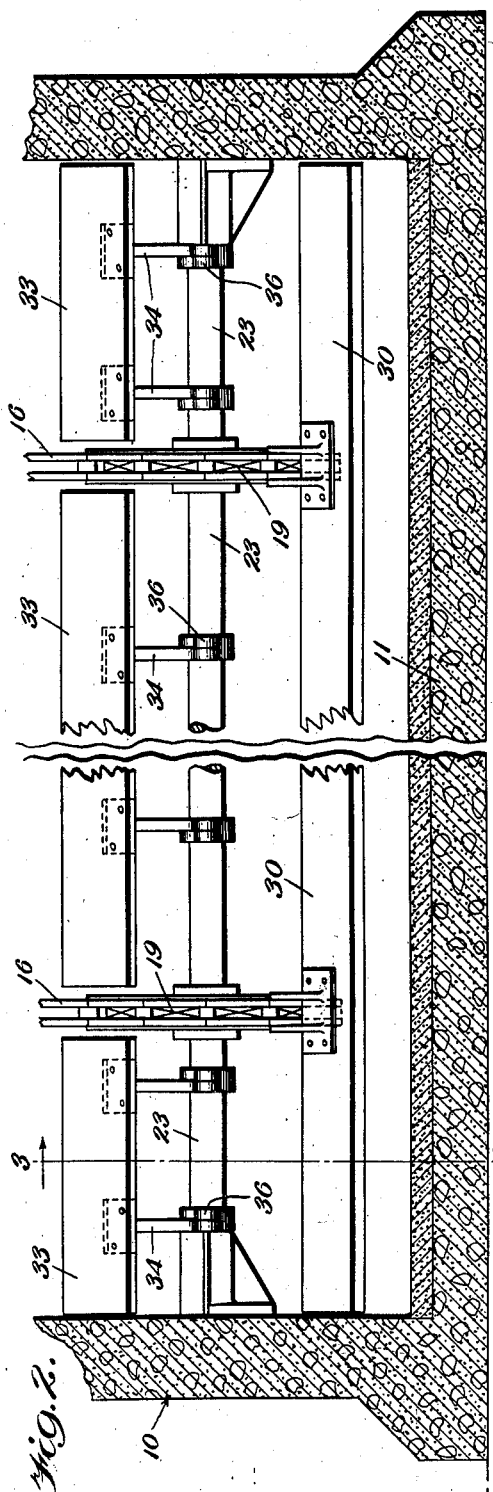
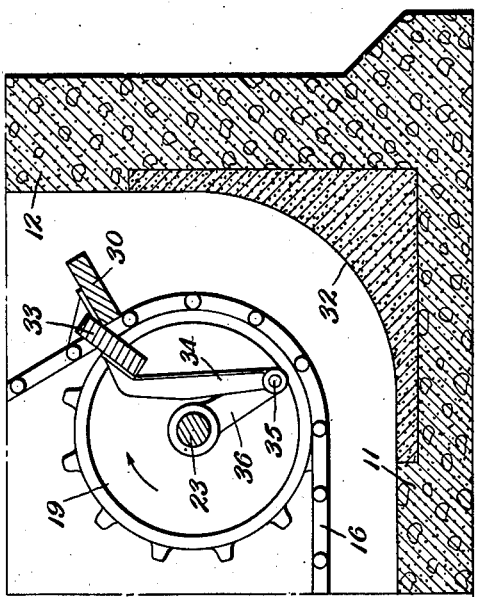
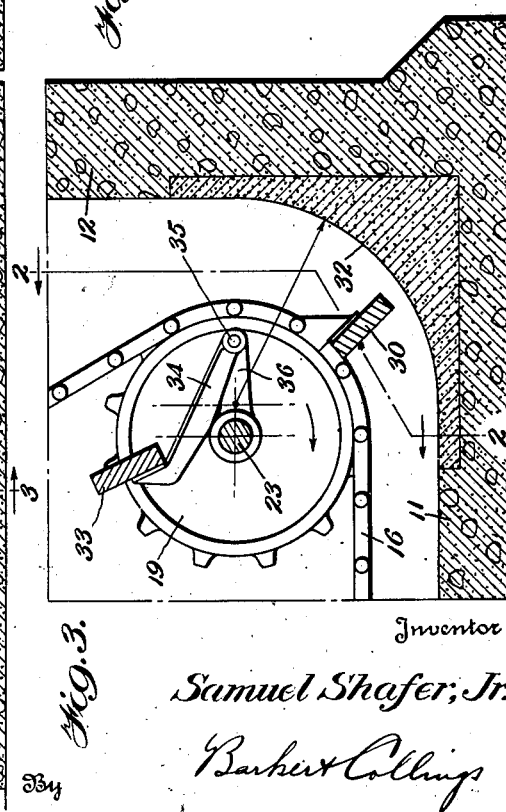
Inventor
Samuel Shafer, Jr.,
By Barker & Collings
Attorneys Patented Jan. 14, 1936

2,028,094

UNITED STATES PATENT OFFICE 2,028,094

SLUDGE REMOVING APPARATUS

Samuel Shafer, Jr., Milwaukee, Wis., assignor to Chain Belt Company, Milwaukee, Wis., a corporation of Wisconsin Application April 17, 1935, Serial No. 16,879

5 Claims. (Cl. 210—3)

This invention relates to sludge removing apparatus for settling tanks and while for purposes of disclosure it has here been illustrated and will be described in connection with a settling tank for sewage disposal apparatus, it is not necessarily limited to such use but may be employed in various other types of sedimentation tanks.

In certain well-known forms of sewage disposal apparatus there is provided one or more tanks or receptacles usually of relatively large size into which the sewage is introduced and the solids contained therein are permitted to settle. The relatively clear liquid is drawn off usually adjacent the surface thereof and there is provided within the tank mechanical means for removing the solids which settle to the tank's bottom, comprising endless belt conveyors having flights or scrapers which travel along the bottom surface of the tank at comparatively slow speeds and scrape the accumulated sludge to a sludge hopper or sump at one end of the tank.

The solids will not accumulate to any appreciable extent upon vertical surfaces of the tank walls, but if such vertical walls form square corners with the tank bottom it is quite difficult to automatically mechanically remove sludge from such corners.

It is one of the principal objects of the present invention therefore to provide a simple and effective means whereby the sludge deposits may be removed from the corners, and more particularly the corners between the vertical end walls and the floor or bottom of the tank, and to this end such corners instead of being formed as sharp right angles are preferably rounded or beveled, there being means provided supplemental to the usual sludge removing conveyor flights which operate over the surface of the tank bottom, to sweep across such curved or partly polygonal corners and to move any solids which deposit thereon to a position in which they may be picked up by the regular conveyor flights and conveyed to the sludge hopper.

With the above and other objects in view which will appear as the description proceeds, the invention consists in the novel details of construction, and the combinations and arrangements of parts more fully hereinafter described and particularly pointed out in the appended claims.

Referring to the accompanying drawings forming a part of this specification, in which like reference characters designate like parts in all the views:

Figure 1 is a diagrammatic longitudinal sectional view through a well-known form of settling tank widely employed in sewage disposal work, having an arcuate corner, and showing the supplemental sludge remover for the said corner associated therewith;

Figure 2 is an enlarged cross sectional view through the bottom portion of the tank taken approximately on the plane indicated by the line 2—2 of Fig. 3 looking in the direction of the arrows;

Figure 3 is an enlarged fragmentary longitudinal sectional view taken approximately on the plane indicated by the line 3—3 of Fig. 2 looking in the direction of the arrows;

Figure 4 is a view similar to Fig. 3, showing the parts in a different position; and Figure 5 is a view similar to Fig. 3, on a reduced scale, illustrating the supplemental sediment remover sweeping a beveled corner.

In the said drawings 10 indicates generally a tank or receptacle usually formed of concrete having a floor or bottom 11 and a vertical end wall 12 which latter is provided with an outlet duct or passage 13 leading from the tank to the effluent passage 14 through which the substantially clear liquid is carried off after the solids initially carried thereby have settled out. These solids collect upon the upper surface of the bottom wall or floor 11 and for the purpose of removing them therefrom there is provided within the tank the sludge removing conveyor 15 comprising spaced endless chains 16 which are trained around sprockets 17, 18, 19, and 20 respectively, carried by shafts 21, 22, 23, and 24 suitably journalled upon the side walls of the tank. The shaft 21 also carries a sprocket 25 around which passes a chain or belt 26 driven by a sprocket 27 carried by a shaft 28 which may be driven from any suitable source of power, not shown. The chains 16 have rigidly secured to them the transverse scrapers or flights 30 which upon the bottom run of the conveyor are moved across the upper surface of the floor 11 from right to left as viewed in Fig. 1, and scrape the accumulated sludge deposits into the sludge hopper or sump 31.

As above indicated, the corner between the vertical end wall 12 and floor 11 instead of being a right angle corner may be formed as the arc of a circle as indicated at 32 in Figs. 1, 3, and 4, and of course, some of the sludge will be deposited upon this curved surface. For the purpose of effectively removing such deposits there is provided according to this invention, a supplemental sludge remover comprising a plurality of flights or scrapers 33 carried by bracket arms 34 which are pivotally connected as at 35 to complemental arms 36 which are rigidly carried by the shaft 23.

As the said shaft 23 is rotated during the travel of the conveyor chains 16, the arms 36 carried thereby will of course likewise be rotated and the supplemental sludge removing assembly 33 and 34 will be carried around with it. In the course of such rotation the supplemental sludge removers will assume a position such as that illustrated in Figs. 2 and 3, and as the rotation of the shaft is continued in the clockwise direction when the arms 36 reach substantially the position shown in Fig. 1 the center of gravity of the supplemental sludge removing assembly will pass to the right of the pivots 35, whereupon the said sludge removers will automatically flop over to substantially the positions shown in Fig. 1 with the outer edge of the flights or scrapers 33 in engagement with the upper portion of the arcuate corner surface 32. As rotation continues the scrapers or flights 33 will be moved across this surface and because of the pivotal connection 35 they will yieldingly engage therewith continuously under the influence of gravity and will scrape any sludge deposits upon the said surface down to the bottom portion thereof where such deposits may subsequently be picked up by the conveyor flights 30 and moved along to the sludge hopper 31.

Through the use of these supplemental sludge removers so constructed, it is not essential that the axis of shaft 23 coincide with the center from which the arcuate surface 32 is struck, and while it may be so coincident it is nevertheless preferred to intentionally offset it to some extent as clearly indicated at Fig. 3.

If the conveyor flights 30 be spaced apart a number of chain links which is equivalent to the number of teeth in the sprocket wheel 19 or any multiple thereof, it will of course be possible to so position the supplemental sludge conveyors 33 that they will never interfere with the said flights 30. On the other hand under some circumstances it may not be possible to so position the flights 30, and in such event there may occasionally arise a situation in which a flight 30 is passing around the sprocket 19 at the time when the supplemental scrapers would normally be coming into action. However, as clearly shown in Fig. 4, should such a condition arise, the supplemental flights 33 will merely engage with and rest behind the flight 30 which happens to be passing around sprocket 19 at the time, being held by the said flight 30 out of engagement with the corner surface 32 and upon this particular rotation performing no scraping action. However, the spacing of the flights 30 under such conditions will be such that upon the next succeeding rotation of sprocket 19 the supplemental sludge removers 33 will not come into action at a time when a flight 30 is passing around the said sprocket and they will function in the manner above described and shown in Fig. 1.

As above indicated, it is not essential that the corners be formed as arcs, or in other words, as sections of polygons having an infinite number of sides, but, as shown in Fig. 5, the vertical wall 12 and horizontal floor 11 may be connected by an inclined or bevel surface 32', and the supplemental scrapers 33 by reason of their construction and mounting will sweep across it, moving any deposits thereon to a position to be picked up by the flights 30, as will be readily understood.

While one form of the invention has been illustrated and described, it is obvious that those skilled in the art may vary the precise details of construction without departing from the spirit of the invention and therefore it is not wished to be limited to the above disclosure except as may be required by the claims.

What is claimed is:

1. In sludge removal apparatus for settling tanks of the type having a curved or beveled corner portion at the juncture of two angularly disposed walls thereof, a movable belt provided with elements arranged to remove sludge from the surface of one of said walls; supporting and guiding means for said belt disposed adjacent said corner; and supplemental sludge removing means carried by said supporting and guiding means, arranged through movement of the latter to remove sludge deposits from said corner portion.

2. In sludge removal apparatus for settling tanks of the type having a curved or beveled corner portion at the juncture of two angularly disposed walls thereof, a movable belt provided with elements arranged to remove sludge from the surface of one of said walls; rotatable supporting and guiding means for said belt disposed adjacent said corner; and supplemental sludge removing means pivotally carried by said supporting and guiding means, and arranged to be brought into engagement with, and moved across, said corner portion, to remove sludge deposits therefrom.

3. In sludge removal apparatus for settling tanks of the type having a curved or beveled corner portion at the juncture of two angularly disposed walls thereof, a movable belt provided with elements arranged to remove sludge from the surface of one of said walls; a shaft and a wheel carried thereby, for supporting and guiding said belt adjacent said corner; and supplemental sludge removing means pivotally carried by said shaft, and arranged to be brought into engagement with and moved across said corner portion to move sludge accumulations thereon to a position in which they may be acted upon by the sludge removing means of said belt.

4. In sludge removal apparatus for settling tanks of the type having a curved corner portion at the juncture of two angularly disposed walls thereof, a movable belt provided with elements arranged to remove sludge from the surface of one of said walls; a shaft and a wheel carried thereby, for supporting and guiding said belt adjacent said curved corner, the axis of said shaft being eccentric with respect to the center of the arc of said curved portion; and supplemental sludge removing means pivotally carried by said shaft, and arranged to be brought into engagement with and moved across said curved corner portion to remove sludge accumulations therefrom.

5. In sludge removal apparatus for settling tanks of the type having an arcuate corner at the juncture of two angularly disposed walls thereof, a movable belt provided with elements arranged to remove sludge from the surface of one of said walls; a shaft and a wheel carried thereby, for supporting and guiding said belt adjacent said arcuate corner, the axis of said shaft being eccentric with respect to the center from which said arc is struck; arms carried by said shaft; and a supplemental sludge removing member pivotally connected to said arms eccentrically of the shaft axis, and arranged through rotation of the shaft to be brought into engagement with and sweep across said arcuate corner, whereby sludge accumulations on the latter may be moved into the path of the sludge removing means of said belt.

SAMUEL SHAFER, Jr.